United States Patent
Iftime et al.

(10) Patent No.: US 11,834,592 B2
(45) Date of Patent: Dec. 5, 2023

(54) METHOD FOR JOINING DISSIMILAR MATERIALS

(71) Applicant: PALO ALTO RESEARCH CENTER INCORPORATED, Palo Alto, CA (US)

(72) Inventors: Gabriel Iftime, Dublin, CA (US); David Mathew Johnson, San Francisco, CA (US); Jessica Louis Baker Rivest, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 250 days.

(21) Appl. No.: 17/169,874

(22) Filed: Feb. 8, 2021

(65) Prior Publication Data

US 2021/0163789 A1  Jun. 3, 2021

Related U.S. Application Data

(62) Division of application No. 16/042,679, filed on Jul. 23, 2018, now Pat. No. 10,947,419.

(51) Int. Cl.
| | |
|---|---|
| *B29C 64/336* | (2017.01) |
| *C09J 5/04* | (2006.01) |
| *B29C 65/52* | (2006.01) |
| *B29C 65/00* | (2006.01) |
| *C09J 163/00* | (2006.01) |
| *B32B 5/14* | (2006.01) |
| *B32B 27/38* | (2006.01) |
| *C09J 5/00* | (2006.01) |
| *C09J 9/00* | (2006.01) |
| *C09J 11/04* | (2006.01) |
| *B29K 307/04* | (2006.01) |

(52) U.S. Cl.
CPC ............... *C09J 5/04* (2013.01); *B29C 65/526* (2013.01); *B29C 66/7212* (2013.01); *B32B 5/14* (2013.01); *B32B 5/142* (2013.01); *B32B 5/145* (2013.01); *B32B 27/38* (2013.01); *C09J 163/00* (2013.01); *B29K 2307/04* (2013.01); *C09J 2463/00* (2013.01)

(58) Field of Classification Search
None
See application file for complete search history.

(56) References Cited

U.S. PATENT DOCUMENTS

| | | | |
|---|---|---|---|
| 4,271,112 A | 6/1981 | Rossman et al. | |
| 4,505,777 A | 3/1985 | Richter | |
| 5,580,512 A | 12/1996 | Koon et al. | |
| 6,025,285 A | 2/2000 | Vyakarnam et al. | |
| 6,123,882 A | 9/2000 | Uchida | |
| 6,636,676 B1 | 10/2003 | Renn | |
| 7,182,815 B2 | 2/2007 | Katagami et al. | |
| 7,897,248 B2 | 3/2011 | Barrera et al. | |
| 7,938,341 B2 | 5/2011 | King et al. | |
| 7,951,464 B2 | 5/2011 | Roberts | |
| 9,718,914 B2 | 8/2017 | Iftime et al. | |
| 2005/0005437 A1 | 1/2005 | Nakamura et al. | |
| 2005/0074993 A1 | 4/2005 | Khairul et al. | |
| 2007/0154771 A1 | 7/2007 | Jang et al. | |
| 2008/0111282 A1 | 5/2008 | Xie | |
| 2008/0149900 A1 | 6/2008 | Jang et al. | |
| 2008/0268318 A1 | 10/2008 | Jang et al. | |
| 2009/0155545 A1 | 6/2009 | Purdy et al. | |
| 2010/0007692 A1* | 1/2010 | Vanmaele | B41C 1/003 522/101 |
| 2011/0079936 A1 | 4/2011 | Oxman | |
| 2014/0027952 A1 | 1/2014 | An et al. | |
| 2014/0236299 A1 | 8/2014 | Roeder et al. | |
| 2014/0242310 A1 | 8/2014 | Guillemette | |
| 2014/0255646 A1 | 9/2014 | Griess et al. | |

(Continued)

FOREIGN PATENT DOCUMENTS

| | | |
|---|---|---|
| CN | 102102001 | 6/2011 |
| EP | 3 135 734 | 3/2017 |

(Continued)

OTHER PUBLICATIONS

Salvador M. Aceves, et al., Safe, long range, inexpensive and rapidly refuelable hydrogen vehicles with cryogenic pressure vessels, International Journal of Hydrogen Energy, 38:5,Feb. 19, 2013, pp. 2480-2489.

Salvador M. Aceves, et al., "Compact (L)H2 Storage with Extended Dormancy in Cryogenic Pressure Vessels," Project ID ST003, Lawrence Livermore National Laboratory, Jun. 8, 2010.

Yanbin Cui, et al., "Gas barrier performance of graphene/polymer nanocomposites," Carbon, 98, Mar. 2016, pp. 313-333.

Ingo Pinnau and Lora G. Toy, "Gas and vapor transport properties of amorphous perfluorinated copolymer membranes based on 2,2-bistrifluoromethyl-4,5-difluoro-1,3-dioxole/tetrafluoroethylene," J. Membrane Sci., 109:1, Jan. 10, 1996, pp. 125-133.

(Continued)

*Primary Examiner* — Michael J Feely
(74) *Attorney, Agent, or Firm* — Miller Nash LLP (57) ABSTRACT

A deposition system has a multi-material print head, a first reservoir of a first compatible material having particles containing chemical elements similar to a first substrate, a second reservoir of a second compatible material having particles containing chemical elements similar to a second substrate, a third reservoir of an polymer precursor material, and at least one mixer. A method of bonding a joint between dissimilar substrate materials includes functionalizing a first compatible material having chemical elements similar to a first substrate, mixing the first compatible material with a polymer precursor material, functionalizing a second compatible material having chemical elements similar to a second substrate, mixing the second compatible material with a polymer precursor material, and using the deposition system to deposit the first and second compatible materials and a polymer precursor material on the joint between the first and second substrate materials.

5 Claims, 5 Drawing Sheets

(56) References Cited

U.S. PATENT DOCUMENTS

| | | |
|---|---|---|
| 2014/0291886 A1 | 10/2014 | Mark |
| 2015/0024270 A1 | 1/2015 | Park et al. |
| 2015/0086881 A1 | 3/2015 | Zhamu et al. |
| 2015/0375490 A1 | 12/2015 | Balachandra et al. |
| 2016/0009029 A1 | 1/2016 | Cohen |
| 2016/0175884 A1 | 6/2016 | Paschkewitz et al. |
| 2016/0176111 A1 | 6/2016 | Paschkewitz et al. |
| 2016/0226042 A1 | 8/2016 | Hartmann et al. |
| 2016/0226114 A1 | 8/2016 | Hartmann et al. |
| 2017/0036396 A1 | 2/2017 | Paschkewitz et al. |
| 2017/0058070 A1 | 3/2017 | Iftime et al. |
| 2017/0120513 A1* | 5/2017 | Brennan ............... B29C 48/92 |
| 2017/0200943 A1 | 7/2017 | Kawakami |
| 2017/0226351 A9 | 8/2017 | Fornes et al. |
| 2017/0355130 A1 | 12/2017 | Paschkewitz et al. |
| 2018/0100047 A1 | 4/2018 | Iftime et al. |
| 2019/0070845 A1* | 3/2019 | Chang .................... B33Y 70/00 |
| 2019/0092994 A1 | 3/2019 | Gwin |
| 2019/0322882 A1* | 10/2019 | Tabayashi ............ C09D 11/101 |
| 2020/0024487 A1 | 1/2020 | Iftime et al. |

FOREIGN PATENT DOCUMENTS

| | | | |
|---|---|---|---|
| WO | 1998013185 | 4/1998 | |
| WO | 03059993 | 7/2003 | |
| WO | WO-2016108519 A1 * | 7/2016 | ........... B29C 64/112 |

OTHER PUBLICATIONS

Ahmad Al-Jabareen, et al., "Improving the oxygen barrier properties of polyethylene terephthalate by graphite nanoplatelets," J. Appl. Polym. Sci., 2012, 128, 1534-1539.

Matthew M. Malwitz, et al., Layered structures of shear-oriented and multilayered PEO/silicate nanocomposite films, Phys. Chem. Chem. Phys. 2004, 6(11), pp. 2977-2982.

Studart, Andre R., "Biological and Bioinspired Composites with Spatially Tunable Heterogeneous Architectures," Advanced Functional Materials 2013, DOI: 10.1002/adfm.201300340, 14 pages.

Holmes Jr., Larry R., "Micro-Composite Fabrication via Field-Aided Laminar Composite (FALCom) Processing," Army Research Laboratory, Sep. 2012, ARL-TR-6106.

Compton and Lewis, "3D-Printing of Lightweight Cellular Composites," Advanced Functional Materials 2014, 26:5930-5935.

Kalaitzidou, et al., "Laser Sintering vs. Melt Compounding: A New Approach for Functionally Graded Polymer Nanocomposites," G.W. Woodruff School of Mechanical Engineering, Georgia Institute of Technology, 10 pages.

Mott and Evans, "Zirconia/alumina functionally graded material made by ceramic ink jet printing," Materials Science and Engineering A271 (1999) 344-352.

3M Scotch-Weld Epoxy Adhesives DP460 Off-White and DP460NS, Technical Data Sheet, Sep. 2017, 8 pp.

Novoselov et al., "A roadmap for graphene," Nature, vol. 490, Oct. 11, 2012, pp. 192-200.

Libanori et al., "Stretchable heterogeneous composites with extreme mechanical gradients," Nature Communications, 3:1265, Dec. 11, 2012, 9 pp.

Rafiee et al., Enhanced Mechanical Properties of Nanocomposites of Low Graphene Content, ACS Nano, 3:12, Dec. 3, 2009.

Choi et al., "High-yield exfoliation of three-dimensional graphite into two-dimensional graphene-like sheets," Chem. Comm., 46:6320-6322, Jul. 1, 2010.

Gupta et al, "Synthesis and characterization of flexible epoxy nanocomposites reinforced with amine functionalized alumina nanoparticles: a potential encapsulant for organic devices," Polym. Chem., 2:221-228, 2011.

Bar-On, et al. "Multiscale structural gradients enhance the biomechanical functionality of the spider fang," Nature Communications, 5:3894, May 27, 2014.

* cited by examiner

METHOD FOR JOINING DISSIMILAR MATERIALS

CROSS REFERENCE TO RELATED APPLICATION

This application is a divisional of, and claims priority to, U.S. patent application Ser. No. 16/042,679 filed Jul. 23, 2018, which is incorporated herein by reference in its entirety.

TECHNICAL FIELD

This disclosure relates to joining dissimilar materials, more particularly joining metals and glass with polymer composite materials.

BACKGROUND

One of the outstanding challenges in the adhesive industry is bonding of dissimilar materials. An adhesive can be optimized for bonding identical parts such as glass-to-glass or carbon fiber reinforced polymer (CFRP), CFRP-to-CFRP but they provide only poor sealing and adhesion between different materials, i.e. glass-to-CFRP. This is because of the different chemical nature and surface free energy properties of these different materials. The problem is particularly relevant for the automotive industry where the introduction of lightweight materials is challenged due to the absence of materials and processes to create mechanically robust and corrosion free load-bearing structures. Examples include joining dissimilar materials such as any combination of the following: carbon fiber reinforced polymer composite (CFRP), fiber glass reinforced polymer (FRP) composite, aluminum, glass, titanium and magnesium. Structural adhesives provide low-cost, corrosion-free bonds and eliminate the need for failure-prone through-holes in CFPC structures, currently used to bond these materials.

For example, leading adhesives such as 3M®'s 460 or Dow Chemical®'s Betaforce®, provide highly effective bonding identical aluminum parts, with a bonding strength up to 40 mega Pascals (MPa). Yet, when bonding aluminum to CFRP parts, the performance of these same adhesives is poor (15 MPa). The CFPC side of the bond requires significant improvement.

It becomes difficult to identify single regular adhesives that provide strong bonding of dissimilar materials.

SUMMARY

According to aspects illustrated here, there is provided a deposition system having a multi-material print head, a first reservoir of a first compatible material having particles containing chemical elements similar to a first substrate, a second reservoir of a second compatible material having particles containing chemical elements similar to a second substrate, a third reservoir of an polymer precursor material, and at least one mixer.

According to aspects illustrated here, there is provided a method of bonding a joint between dissimilar substrate materials that includes functionalizing a first compatible material having chemical elements similar to a first substrate, mixing the first compatible material with a polymer precursor material, functionalizing a second compatible material having chemical elements similar to a second substrate, mixing the second compatible material with a polymer precursor material, and using the deposition system to deposit the first and second compatible materials and a polymer precursor material on the joint between the first and second substrate materials

DETAILED DESCRIPTION OF THE EMBODIMENTS

The ensuing discussion focuses on bonding combinations of different materials such as aluminum, CFRP, glass, fiberglass reinforced polymers (FRP), titanium and magnesium parts, such as commonly occurs in the automotive manufacturing environment. One should understand that this provides only examples and do not limit the invention as claimed to any pair of dissimilar materials.

The embodiments here provide a high-performance structural adhesive for bonding dissimilar materials with the following key features. First, the adhesive has direct chemical bonding to each of the dissimilar materials. Second, the adhesive has a graded composition of chemically and mechanically compatible reinforcing particles with a tunable adhesive elasticity that enables modulation of the particle concentration during deposition. Third, chemically linked networks by covalent bonds, of reinforcing particles that prevent particle separation during impact and stress.

In the embodiments, functionalized particles are dispersed into a matrix. In embodiment, the matrix may consist of polymer precursor materials. Covalent chemically linked particle networks are formed by reacting the chemical functions present onto the particles surface with the polymer precursors to produce a cured structure.

Figure 1:
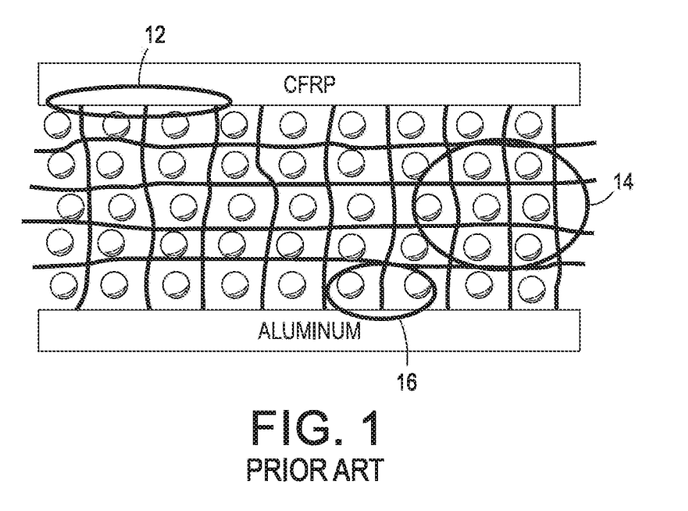
FIG. 1 shows a prior art example of a bond between dissimilar materials.

In current bonds of dissimilar materials, as shown in FIG. 1, polymer bonds are formed between the two parts. The polymer bonds to the parts with a materials mismatch, and has free dispersed particles. This results in weak bonding. The bonds, such as at 12 and 16 at the interfaces between the adhesive and the materials, are the same as they are in regions such as 14 of the adhesive away from the materials.

Direct particle bonding to surfaces results in superior adhesive strength. Current materials achieve their adhesive strength only by the bonding of polymer chains to the surfaces. In the embodiments here, matching particles will directly and covalently bond onto the surface of the joined substrates. Chemical linking forms the bond, or chemical and physical linking simultaneously form the bond in the case of particles. Direct particle bonding to the surface will result from reacting surface functionalized particles with the activated surface using epoxide monomers.

When dissimilar materials bond, it is not sufficient to simply having a strong bond for durability. The bond needs to act to absorb differences in material properties between the two parts. Graded interfaces between different materials can reduce the shear stress at an interface and allow two dissimilar surface to become compatible. This approach can serve to grade mechanical properties between the two materials, as well as to bridge the two materials chemically, allowing for increased bonding.

The effectiveness of the gradient approach to produce enhanced bounding has been shown recently in plastic materials of different stiffness. Studart has bonded hard structures onto a stretchable substrate, and then stretched them up to 350% before delamination occurred (A. R. Studart, et al. *Nature Communications*, 3, 1265 (2102)). Homogenous adhesive bonding failed rapidly at about 200% strain. Using a multilayer graded interface between the dissimilar hard and soft substrates greatly reduced the interlayer shear forces and prevented delamination. This showed an overall increase of the strain level before delamination of approximately 75% when compared to homogenous bonding.

Conventional adhesives rapidly lose their bonding performance as the environmental temperature increases. For example, 3M's 460 epoxy lap shear strength decreases from 30 MPa at 23° C. to 5 MPa at 82° C. and further decreases to 1.5 MPa at 121° C. (http://multimedia.3m.com/mws/media/661220/3mtm-scotch-weld-tm-epoxy-adhesive-dp460-ns-and-off-white.pdf). The cohesive strength of the adhesive at higher temperatures decreases significantly due to the softening of polymer chains as temperatures increase. To improve cohesion at high temperatures, the use of reinforcing particles provides a viable strategy. However, while individual reinforcing particles themselves possess exceptional mechanical strength, translating these properties into macroscopically strong composite structures has not yet been demonstrated. For example, exfoliated graphene particles have outstanding tensile strength (130,000) MPa (Novoselov at al. *Nature*, 490, 192-200 (2012)). The tensile strength decreases by orders of magnitude (250 X) in graphene polymer composites (M. A. Rafiee et. al., ACS NANO, 3884, (2009).

In addition, the free particles are not bonded to the nearby epoxy groups and deformations due to stress can cause permanent dislocation of the particle from the polymer matrix, eventually causing failure. They enable only a limited improvement of the cohesive strength when compared to the polymer material alone. Chemical linking will restrict the movement of the reinforcing particles under mechanical and thermal stresses. As a result, the material should have outstanding thermo-mechanical performance when compared with current adhesives. One expects that the simultaneous enhancement of the cohesive strength, by covalent bonding of the strong particle networks, and of the adhesive strength, by covalent bonding of the strong particle network to each surface, will reduce the slippage between bonded surfaces. Moreover, this will produce adhesive bonds with mechanical thermal cycling and fatigue resistance far exceeding the performance of current adhesives for bonding either identical or dissimilar materials.

The selection of the particles that either match or have similar thermo-mechanical and chemical properties to the respective substrates to be bonded depends on the nature of these materials. This may be achieved by choosing particles that contain chemical elements that are similar to the corresponding compatible substrate. The chemical composition of the particles may or may not be identical to the corresponding compatible substrate. For the purpose of this discussion, "similar chemical elements" means that the particle materials contain at least the key chemical element(s) present in the corresponding compatible substrates. The particles materials may contain additional chemical elements that may not be present in the compatible substrate to be bonded.

One the embodiment of the compatibilizing particles with compatibility with the substrate consist of metal oxides of the same materials as the metal substrates to be bonded. Another embodiment of compatibilizing particles with compatibility with the substrate consist of carbon particles when bonding carbon fiber reinforced polymers (CFRP) substrates.

For example, the particles used for reinforcing the polymer base in the adhesive that is to be placed on the side of a selected substrate are selected based upon the following. For a CFRP substrate, graphene, graphene oxide or carbon nanotube functionalized particles are used. For an aluminum substrate, the compatibilizing particles would consist of aluminum oxide particles ($Al_2O_3$) particles. For a fiber glass reinforced polymers (FRP) substrate, they would consist of silicon oxide ($SiO_2$) particles. For glass, the process would also use silicon oxide ($SiO_2$) particles. For titanium substrates, the process would use titanium dioxide ($TiO_2$). For magnesium substrates, the process would use magnesium oxide (MgO).

Figure 2:
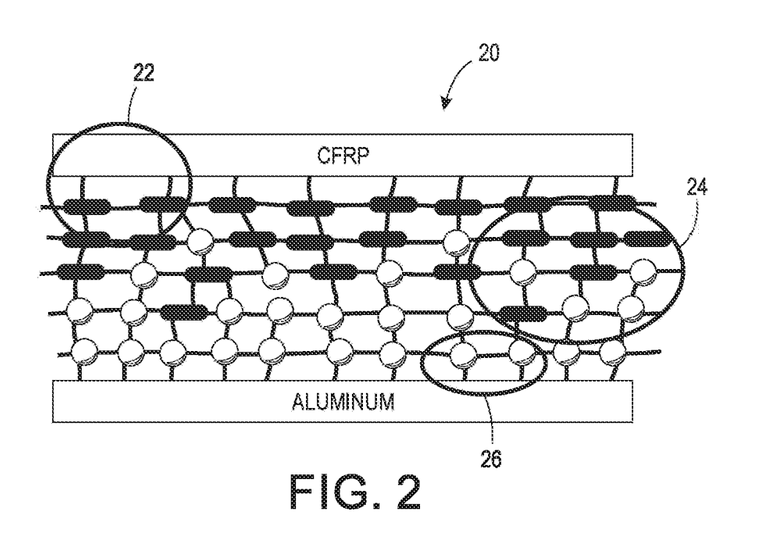
FIG. 2 shows an embodiment of a bond between dissimilar materials.

The adhesive will have a gradient of these materials to have higher concentrations of the material bonding to one of the dissimilar materials at the interface to that material, and then lower concentrations at the interface to the other material. FIG. 2 shows a gradient adhesive bond 20. One should note that in FIG. 2, the first material substrate could be a metal substrate, glass, CFRP, FRP, etc., and the second material substrate would be the other material. The corresponding compatible particles for the first substrate will be referred to as the first compatible particles, the corresponding compatible particles for the second substrate will be referred to as the second compatible particles.

Gradients can occur in multiple ways. A simple gradient may alter the concentration of reinforcement so that the overall concentration of reinforcement is constant across the entire bond, but the relative concentration of each reinforcement changes across the bond so that concentration at the two ends is entirely the compatible reinforcement. However, in other cases, the gradient may be more complicated. To add compliance or reduce corrosion, it may be desirable to have a less stiff section of the bond between the two components. For example, this may be highly desirable when bonding glass to an aluminum component, in this case the overall reinforcement would vary across the bond, reaching its minimum in the middle of the bond with no or little overlap between the two particles. It also may be of interest to provide a gradient across the width of the bond, decreasing the particle concentration at the edges of the bond will increase resistance to some mechanical loading and may be desirable.

As an example, the bonding of a first substrate as CFRP and a second substrate as an aluminum substrate is illustrated. At the CFRP interface 22, the carbon fibers from the CFRP material chemically bond to the graphene particles as the first compatible particles in the adhesive, with a higher concentration of the graphene at this interface than at the other, and a higher concentration of graphene than the aluminum oxide as the second compatible particles at this interface. The gradient for the aluminum oxide goes in the other direction, with a higher concentration of aluminum oxide at the aluminum interface 26, and a lower concentration moving towards the CFPC-adhesive interface. The region in the middle, such as 24, has a mix of the two particles.

Multiple adhesive chemistries are suitable for the present invention. Particularly preferred are vinyl, such as acrylic adhesives, and epoxy adhesives. Acrylic adhesives are particularly advantageous in situations when fast curing is required. When acrylic adhesives are being used, they require employing vinyl functionalized particles. They can be obtained for example by reacting X—(R)-Vinyl molecule with —COOH or —OH functionalized particles. An example of a suitable reactive X group is epoxy group. Another approach to vinyl functionalized particles involves coupling of reactive particles with silane coupling agents containing functional groups such as vinyl, including acrylates, and methacrylates.

Generally speaking, conventional two-part epoxy adhesives consist of a part A, epoxy material, and a part B, hardener. Each of the two adhesives forming the gradient adhesive bond will be deposited as a mixture of its own part A and part B. For each of these two adhesives, the reinforcing particles disclosed in the present invention can be present in either of the two corresponding parts A or B. For example, in further describing the CFRP and aluminum parts bonding embodiment, appropriately functionalized particles can be present as follows in the formulation: graphene particles can be present into the epoxy part A or into the hardener part B materials. Just prior to deposition, the part A and B are mixed and the mixture represents the CFRP compatible adhesive material. In a similar way, aluminum oxide particles can be placed into the epoxy part A or into the hardener part B materials. Prior to deposition, the part A and B are mixed and the mixture represents the aluminum compatible adhesive material. These premixed formulations are used to produce the gradient adhesive structure when the ratio between the two mixtures is gradually changed.

The choice of placing the functionalized particles in the epoxy, part A, or the hardener, part B, is dictated by the type of functional groups present onto particles. The particles must be stable in the base material. For example, functionalized particles in the hardener must not react with the hardener but must react with the epoxy when the hardener/particle dispersion is mixed with the epoxy. Similarly, functionalized particles in epoxy must not react with the epoxy material but must react with the hardener when the epoxy/particle dispersion is mixed with the hardener. Once part A and part B of each of the adhesives are mixed the curing is initiated by the reaction between the amino groups and epoxy groups both those present in the base materials and those present onto the surface of the particles. Depending on the type of hardener, such as amino component, the curing can be performed at the ambient temperature or at higher temperature by heating. Generally, a curing process that may be relatively slow at ambient temperature is significantly accelerated by curing at a higher temperature.

One embodiment involves functionalized particles dispersible in the hardener material. The hardener materials contain mostly reactive amino groups. Suitable functionalized particles that are stable and dispersible in hardener material include particles possessing groups such as amino ($-NH_2$, $-NHR$) groups, alcohol groups ($-OH$) and carboxylic acid groups ($-COOH$). A hardener formulation containing such functional particles will cure when mixed with the epoxy component, part A, either at room temperature or by heating due to the coupling reaction between these functional groups and the epoxy groups, as it is well known to those skilled in the epoxy adhesives.

One exemplary embodiment involves amino functional groups. The process for fabrication of amino functionalized particles depends on the starting particle and more precisely on the coupling functional groups present onto particles.

One method for introduction of amino groups onto metal oxide particles such as $SiO_2$, $Al_2O_3$, $TiO_2$ or $MgO$, involves surface functionalization of metal oxide particles with amino functionalized silane coupling reagents. Amino silane coupling agents have a general structure such as $H2N-(X)-Si(OR)_3$ where the $-Si(OR)_3$ groups that react selectively with the $-OH$ groups present onto particles surface to produce particles terminated with amino groups as illustrated in the figure below:

Amino functionalized exfoliated graphene sheets can be fabricated in several ways. The process can use any available graphene material as a starting material. This includes graphene, graphite, graphene with any substituting or doping chemical elements such as for example graphene containing oxygen functions, such as in the case of graphene oxide. Graphene with other chemical elements is also suitable for fabrication of amino functionalized exfoliated graphene sheets. One process as disclosed by Choi, et al. (*Chem. Commun.*, (2010), 46, 6320-2). Exfoliation is a process of turning three-dimensional molecules into two-dimensional sheets. In this process, amino functionalized sheets are fabricated through a mild Friedel-Crafts substitution reaction onto graphite particles with simultaneous exfoliation of amino functionalized graphene sheets. Another approach to producing amino functionalized graphene sheets starts from graphene oxide (GO) sheets. Graphene oxide contains a large content of —COOH and —OH functional groups that can be used for introduction of amino functional groups, for example by reacting GO with molecules of the general structure X—(R)—NH2 where X has a selective reaction with —OH or —COOH groups in the presence of a catalyst. Suitable X groups include —$NH_2$ and silane coupling agents (—$Si(OR)_3$) groups. Other methods for producing amino-functionalized graphene particles may be available and they are all suitable for this invention.

In a further embodiment, the functionalized particles are dispersed in the hardener, part B, the reactive functional groups of are either —COOH or —OH groups. Most often, particles such as $SiO_2$, $Al_2O_3$ or $TiO_2$ have hydroxyl groups present onto their surface. In the case of graphene sheets, a suitable particle is graphene oxide that contains a large content of —COOH and —OH functional groups.

A second embodiment involves functionalized particles dispersed in the epoxy material (part A). Suitable examples include epoxy functionalized particles because they are stable and compatible with epoxy base materials. Epoxy functionalized particles can be fabricated by reacting —OH or —COOH functional groups present onto the surface of the particles with epoxy containing reagents of a general structure X—(R)-Epoxy where X reacts selectively with —OH and —COOH groups. The process is applicable to any type of —OH and —COOH functionalized particles, including $Al_2O_3$, $SiO_2$, $TiO_2$, MgO and similar as well as graphene oxide. A preferred reactive X function is an epoxy group.

In the embodiment of aluminum bonding aluminum to CFPC, the resulting bond has a higher concentration of aluminum oxide than graphene at the aluminum interface and a higher concentration of graphene than aluminum oxide at the CFPC interface. In a more general sense, the compound has two materials as hardeners in an epoxy resin, where each material has a graded composition of a higher concentration at one of the substrates moving towards a lower concentration at the other substrate, and the two materials have graded compositions in the opposite direction.

In a different embodiment with epoxy functionalized particles involves a type of one part epoxy formulations wherein an epoxy material is mixed with epoxy functionalized particles and with a curing initiator that is activated only when heated at a certain temperature. This type of formulation is advantaged by the fact that the formulation can be stable in that is does not cure and can be shipped and handled for long periods of time before application. This formulation is also advantageous because it reduces the number of mixing steps require for each of the part A and B of each of the adhesives using amino hardeners. After deposition the curing takes place by heating at a temperature above the ambient temperature such as at 80 deg. C or 100 deg. C or higher for various time durations such as from minutes to hours. Optionally, a second heating step can be performed at a higher temperature, such as 160° C. or 200° C. or 220° C. This process ensures curing completion and generally produces stiffer bond when compared with curing at only lower temperatures.

The present approach is generally applicable to bonding any two different materials. For example, when bonding CFRP to glass, the CFRP side of the adhesive layer contains functionalized graphene particles while on the glass side the adhesive contains $SiO_2$ functionalized particles. When bonding aluminum to glass, the aluminum side of the adhesive layer contains functionalized $Al_2O_3$ particles while on the glass side the adhesive contains $SiO_2$ functionalized particles.

Figure 3:
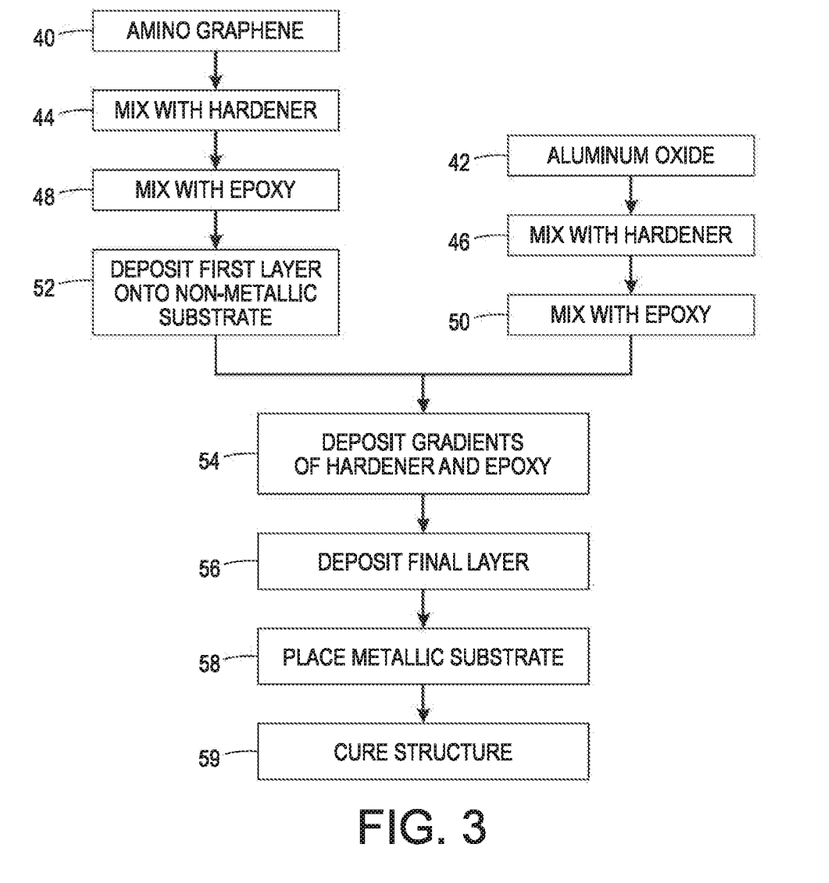
FIG. 3 shows an embodiment of a method of forming a gradient adhesive bond with dissimilar materials.

FIG. 3 shows an embodiment of a method of depositing a gradient adhesive for dissimilar materials using epoxy embodiment. The examples used here illustrate the use of amino functionalized particles dispersed in a hardener when bonding CFRP and aluminum. The process uses exfoliated amino graphene 40 and amino aluminum oxide 42 particles. At 44 Amino graphene is mixed with hardener material to provide a graphene hardener, which is then mixed in the next step with epoxy material 48. Similarly, amino $Al_2O_3$ at 42 is first mixed with the hardener to provide an $Al_2O_3$ hardener at 46 which is then mixed in the next step with epoxy material at 50. The hardener and epoxy materials may be the same for each of the two adhesive particles.

These materials are provided to the print head. A print head, in the context of the present embodiments may include any extrusion and coextrusion deposition device, such as slot die or conventional extrusion through a needle. The following examples illustrate the deposition through a slot die.

Successive layers ranging from a first layer of pure amino graphene/epoxy mixture 52, up to a last layer consisting of pure amino $Al_2O_3$/epoxy formulation 56 with intermediate gradual decreasing concentration of the amino graphene/epoxy and increasing concentration of amino $Al_2O_3$/epoxy 54 are deposited through a slot die. The aluminum substrate is placed on top of the deposited gradient adhesive 58 and the bonded structure is cured 59.

Figure 4:
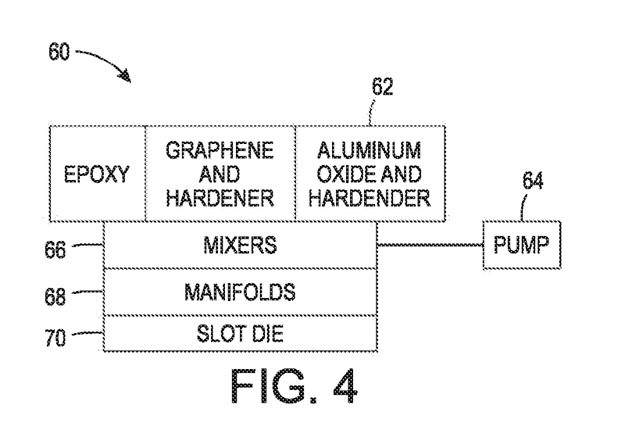
FIG. 4 shows a block diagram of an embodiment of a gradient adhesive print head.
Figure 5:
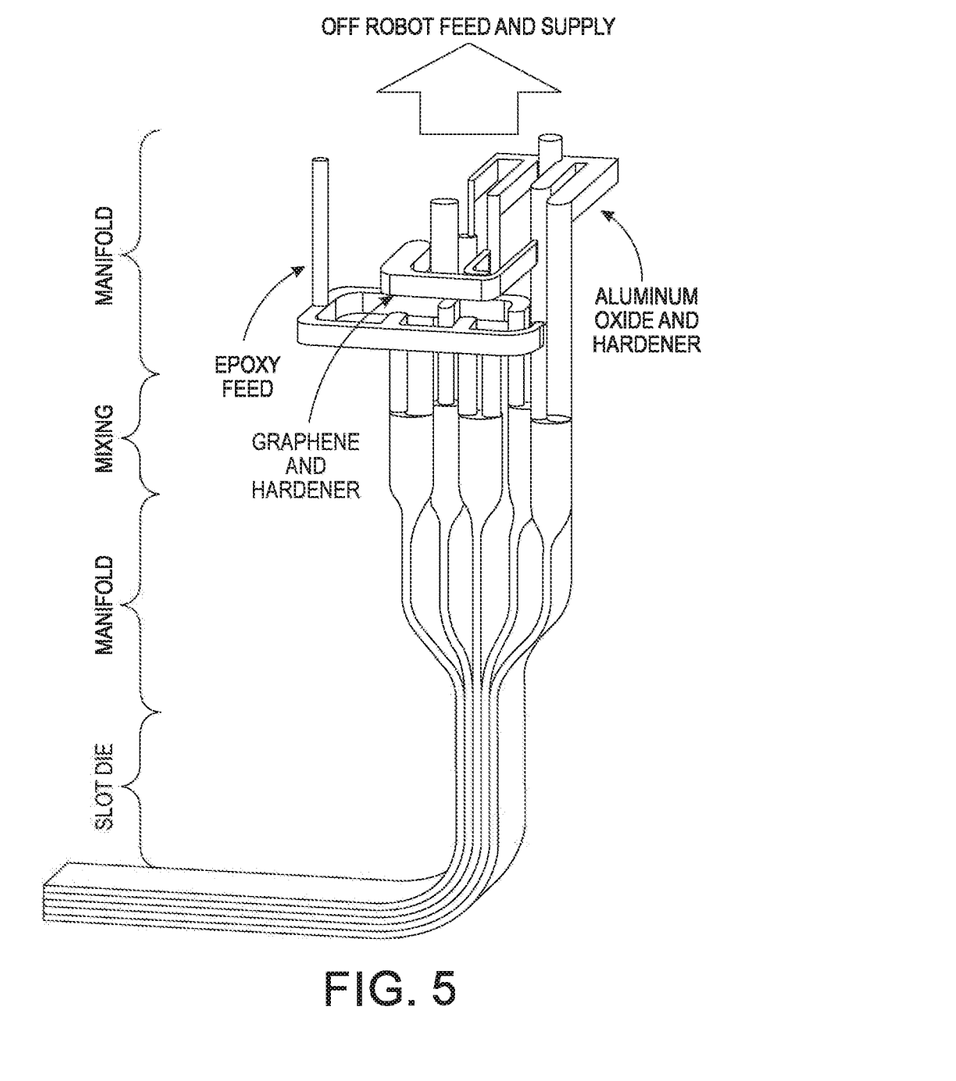
FIG. 5 shows an embodiment of a slot die print head suitable for depositing gradient adhesives

To achieve deposition rates fast enough for automotive applications, a print head capable of producing gradient adhesive bonds can deposit the adhesive in a single pass. Traditional automated automotive adhesive dispensers consist of a single needle point application mounted on the front of a robot with a single material feed system. The robot has either undergone pre-programming or uses a vision system to locate the appropriate application point and dispense the needed amount of adhesive. FIG. 4 5 show an embodiment of a slot die print head.

In FIG. 4, the slot die print head 60 has material feeds 62 of the epoxy, the graphene and hardener, and the aluminum oxide and hardener. A pump 64 typically provides the pressure to move the materials. The mixer or mixers 66 receive the materials from the material feeds and provide the desired concentrations for the adhesive bond being formed. The manifolds 68 then merge the feeds, and the die itself 70 deposits the adhesive across the interface between the dissimilar materials to form the bond. FIG. 5 shows an image of such a print head.

The print head can deposit small numbers of layers by premixing formulas and depositing all three layers simultaneously. The ideal graded bond may require larger numbers of layers. To accomplish multiple layers simultaneously, the print head may mix the epoxy formulations, meaning the combination of hardeners and resin, within the print head. This also allows for changes in gradient composition if necessary, customizing the gradient for a specific bond. This may reduce equipment costs and maximize flexibility in automotive factories.

Figure 6:
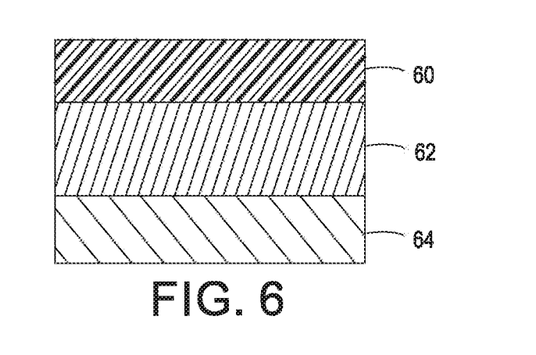
FIGS. 6-9 shows different bonding techniques.

FIGS. 6-9 show variations of the different bonds. FIG. 6 shows an embodiment of a bond in accordance with the traditional bonding techniques. A monolithic layer of adhesive 62 bonds a substrate of a first material, such as carbon fiber, 60 and a substrate of a second material, such as aluminum 64. There are sharp changes in the properties between the various layers.

Figure 7:
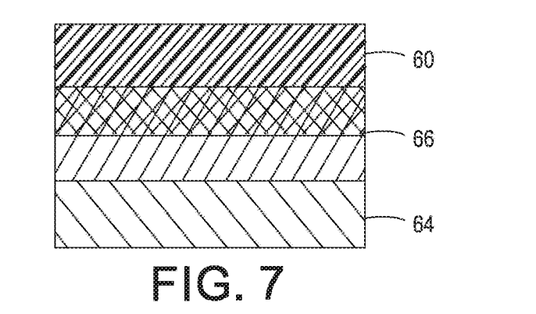

In contrast, the embodiments discussed here have gradients within a base material of particles of compatible materials. In FIG. 7, a high rigidity bond has a particle concentration kept high in the adhesive layer 66 allowing the mechanical properties to transition from graphene to aluminum oxide.

Figure 8:
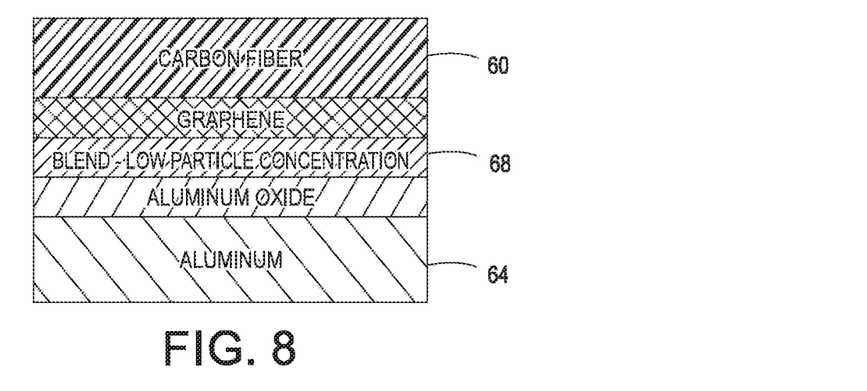

FIG. 8 shows a flexible gradient bond to compensate for dimensional or thermal differences. The adhesive layer 68 has a flexible gradient bond with a lower concentration of particle reinforcement, allowing for flexibility while maintaining gradual changes in properties such as thermal or dimensional differences.

Figure 9:
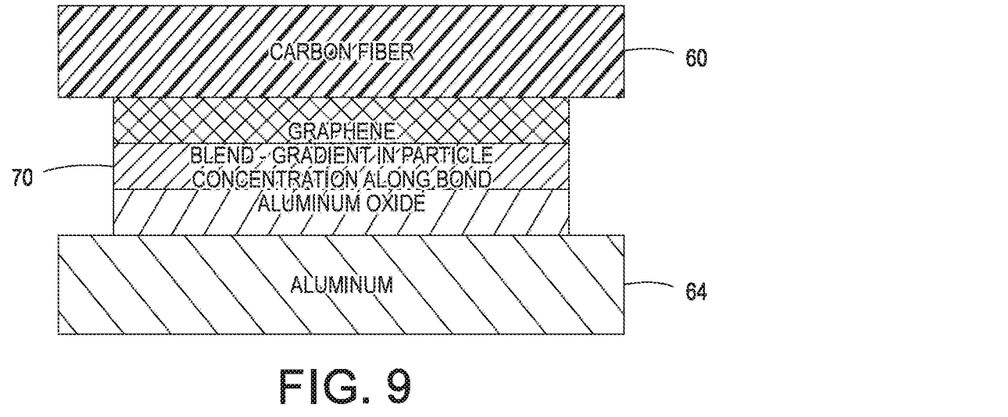

FIG. 9 shows an adhesive layer 70 that has a particle gradient in the plane of the bond. This allows for an increase in the overall bond strength.

In this manner, the embodiments achieve a structural adhesive that had enhanced cohesive strength enabled by chemically linked networks of reinforcing particles that prevent particle motion during impact and stress. The adhesive has maximized strength due to direct chemical bonding of matched particles to the surfaces. The embodiments create an enhanced interface between dissimilar materials with the graded composition of chemically and mechanically compatible reinforcing particles. These embodiments easily integrate with current robotic deposition systems with the replacement of the current nozzles with a multi-material slot die.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A deposition system for joining two dissimilar substrates with an adhesive, comprising:
   a multi-material print head;
   a first reservoir of a material comprising first particles functionalized with curable reactive groups, the first particles having similar chemical elements and compatibility with a first of the two dissimilar substrates;
   a second reservoir of a material comprising second particles functionalized with curable reactive groups, the second particles having similar chemical elements and compatibility with a second of the two dissimilar substrates;
   a third reservoir of a material comprising a curable adhesive;
   a pump to provide pressure to move the materials; and
   at least one mixer configured to selectively mix multiple curable adhesive mixtures of the materials at various concentrations, and feed each curable adhesive mixture to the multi-material print head;
   wherein the multi-material print head forms the adhesive by depositing layers of each curable adhesive mixture on the first substrate, the adhesive having:
   an exposed bonding surface for contacting the second substrate;
   a concentration gradient of the first particles that increases in a region approaching the first substrate; and
   a concentration gradient of the second particles that increases in a region approaching the exposed bonding surface.

2. The deposition system of claim 1, wherein the first particles and the second particles are selected from the group consisting of: functionalized graphene; functionalized graphene oxide; functionalized carbon nanotubes; functionalized aluminum oxide; functionalized titanium dioxide; functionalized silicon dioxide; and magnesium dioxide; and
   wherein the second particles are different from the first particles.

3. The deposition system of claim 1, further comprising at least one manifold when multiple mixers are present to merge multiple mixtures.

4. The deposition system of claim 1, wherein the multi-material print head comprises a coextrusion deposition device or a slot die.

5. The deposition system of claim 4, wherein the multi-material print head is mounted to a robotic system.

* * * * *